(12) United States Patent
Battaglino et al.

(10) Patent No.: US 10,635,983 B2
(45) Date of Patent: Apr. 28, 2020

(54) ACCOUSTIC CONTEXT RECOGNITION USING LOCAL BINARY PATTERN METHOD AND APPARATUS

(71) Applicant: GOODIX TECHNOLOGY (HK) COMPANY LIMITED, Hong Kong (HK)

(72) Inventors: Daniele Battaglino, Alpes-Maritimes (FR); Ludovick Lepauloux, Cannes (FR); Laurent Pilati, Biot (FR); Nicholas Evans, Valbonne (FR)

(73) Assignee: GOODIX TECHNOLOGY (HK) COMPANY LIMITED, Hong Kong (HK)

( * ) Notice: Subject to any disclaimer, the term of this patent is extended or adjusted under 35 U.S.C. 154(b) by 797 days.

(21) Appl. No.: 15/141,942

(22) Filed: Apr. 29, 2016

(65) Prior Publication Data
US 2016/0335553 A1    Nov. 17, 2016

(30) Foreign Application Priority Data
May 12, 2015   (EP) .................................... 15290128

(51) Int. Cl.
*G06F 15/18* (2006.01)
*G06N 5/04* (2006.01)
(Continued)

(52) U.S. Cl.
CPC ......... *G06N 5/047* (2013.01); *G06K 9/00523* (2013.01); *G06K 9/6269* (2013.01); *G06N 20/00* (2019.01); *G10L 19/02* (2013.01); *G10L 21/06* (2013.01); *G10L 21/10* (2013.01); *G10L 25/18* (2013.01); *G10L 25/48* (2013.01); *G06K 2009/4666* (2013.01); *G10L 21/0232* (2013.01); *G10L 2019/0004* (2013.01)

(58) Field of Classification Search
CPC .............. G06N 5/047; G06N 20/00–20; G10L 21/06–18; G10L 19/02–0216; G10L 25/18; G10L 25/27–25/39; G10L 25/48
USPC .............................. 704/200–278; 706/12, 13
See application file for complete search history.

(56) References Cited

U.S. PATENT DOCUMENTS 8,606,293 B2 * 12/2013 Kim ................... G06Q 30/0261
                                                    455/456.1
9,297,881 B2 *  3/2016 Khosravy ............. G01S 5/0263
(Continued)

OTHER PUBLICATIONS

Bai, "Cosine Similarity Metric Learning for Face Verification", 2010, Proceedings of the 10th Asian conference on Computer vision.*

(Continued)

*Primary Examiner* — Jue Louie

(57) ABSTRACT

Various exemplary aspects are directed to acoustic context recognition apparatuses and methods involving isolating and identifying context(s) of an acoustic environment. In one exemplary embodiment, source audio is converted into audio spectrograms, each spectrogram indicative of a period of time. The series of spectrograms are analyzed to identify audio patterns, over a period of time, which are indicative of an environmental context of the source audio. In many embodiments of the present disclosure, acoustic context recognition also includes comparing the identified audio patterns to known environmental contexts.

17 Claims, 4 Drawing Sheets

(51) Int. Cl.

| | | |
|---|---|---|
| G06N 20/00 | (2019.01) | |
| G10L 25/48 | (2013.01) | |
| G10L 25/18 | (2013.01) | |
| G10L 21/06 | (2013.01) | |
| G06K 9/00 | (2006.01) | |
| G06K 9/62 | (2006.01) | |
| G10L 19/02 | (2013.01) | |
| G10L 21/10 | (2013.01) | |
| G10L 21/0232 | (2013.01) | |
| G06K 9/46 | (2006.01) | |
| G10L 19/00 | (2013.01) | |

(56) References Cited

U.S. PATENT DOCUMENTS

| | | | | |
|---|---|---|---|---|
| 9,922,646 | B1* | 3/2018 | Blanksteen | ............ H04S 7/302 |
| 2011/0126119 | A1* | 5/2011 | Young | ............... G06F 16/9577 |
| | | | | 715/744 |
| 2015/0205575 | A1* | 7/2015 | Kitazawa | ............ G10L 21/0216 |
| | | | | 700/94 |

OTHER PUBLICATIONS

Nguyen et al. "Object Detection using Non-Redundant Local Binary Patterns", 2010, IEEE 17th International Conference on Image Processing.*

Briggs "Multi-Instance Multi-Label Learning: Algorithms and Applications to Bird Bioaccoustics", 2013, Doctoral Thesis, Oregon State University.*

Kobayashi et al. "Acoustic Feature Extraction by Statistics Based Local Binary Pattern for Environmental Sound Classification", 2014, IEEE International Conference on Acoustic, Speech and Signal Processing.*

Vaizman et al. "Codebook-Based Audio Feature Representation for Music Information Retrieval", 2014, IEEE/ACM Transactions on Audio, Speech, and Language Processing, vol. 22, No. 10.*

Li et al. "Speaker Identification Based on Spectrogram and Local Binary Patterns", Apr. 15, 2015, Journal of Computational Information Systems 11:8.*

Ma et al. "Environmental Noise Classification for Context-Aware Applications", 2003, International Conference on Database and Expert Systems Applications.*

Smith et al. "Acoustic environment as an indicator of social and physical context", 2006, Personal and Ubiquitous Computing, vol. 10, issue 4.*

Esfahanian et al. "Using local binary patterns as features for classification of dolphin calls", Jul. 2013, Journal of Acoustical Society of America.*

Alegre, Federico et al; "A One-Class Classification Approach to Generalised Speaker Verification Spoofing countermeasures using Local Binary Patterns"; International Conference on Biometrics: Theory, Applications and Systems (BTAS) 9 pages (2013).

Banerji, Sugata et al; "A New Bag of Words LBP (BoWL) Descriptor for Scene Image Classification"; 20th Eunice/IFIP EG 6.2, 6.6 International Workshop Advances in Communication Networking; Rennes, France, Sep. 1-5, 2014, Revised Selected Papers, Springer Verlag, DE; pp. 490-497 (08/232013).

Bilaniuk, Olexa et al; "Fast LBP Face Detection on low-power SIMD architectures"; CVPR2014 Workshop; Computer Vision Foundation; 7 pages (2014).

Burred, Juan Jose; "Genetic Motif Discover Applied to Audio Analysis"; retrieved from the internet http://www.jjburred.com/research/pdf/burred_icassp2012.pdf (2012).

Chang, Chih-Chung et al; "LIBSVM: A Library for Support Vector Machines"; ACM Transactions on Intelligent Systems and Technology, vol. 2; 39 pages (2011).

Choi, Jonghyun et al; "Toward Sparse Coding on Cosine Distance"; 22nd International Conference on Pattern Recognition, IEEE; Stockholm, Sweden; pp. 4423-4428 (Aug. 24-28, 2014).

Chum, May et al; "IEEE AASP Scene Classification Challenge Using Hidden Markov Models and Frame Based Classification"; IEEE AASP Challenge on Detection and Classification of Acoustic Scenes and Events; Creative Commons; 3 pages (2013).

Costa, Y.M.G. et al; "Music genre classification using LBP textural features"; Signal Processing vol. 92, No. 11; Elsevier; pp. 2723-2737 (Nov. 1, 2012).

Costa, Yandre et al; "Music Genre Recognition Using Gabor Filters and LPQ Texture Descriptors"; Progress in Pattern Recognition, Image Analysis, Computer Vision, and Applications, Springer Berlin Heidelberg, pp. 67-74 (2009).

Dennis, Jonathan William; "Sound Event Recognition in Unstructured Environments Using Spectrogram Image Processing"; Nanyang Technological University, School of Computer Engineering; 204 pages (Jan. 2014).

Elizalde, Benjamin et al; "An I-Vector Based Approach for Audio Scene Detection"; IEEE AASP Challenge on Detection and Classification of Acoustic Scenes and Events; Creative Commons (2013).

Extended European Search Report for application 15290128.6 (dated Sep. 18, 2015).

Geiger, Jurgen T. et al; "Recognising Acoustic Scenes with Large-Scale Audio Feature Extraction and SVM"; IEEE A Challenge on Detetion and Classification of Acoustic Scenes and Events; Creative Commons (2013).

Giannoulis, Dimitrios et al; "Detection and Classification of Acoustic Scenes and Events—Technical Report"; IEEE AASP Challenge; Queen Mary, University of London, School of Electronic Engineering and Computer Science; 9 pages; (Mar. 2013).

Heittola, Toni et al; "Context-dependent sound event detection"; EURASIP Journal on Audio, Speech, and Music, a SpringerOpen Journal; 13 pages (2013).

Hermansky, Hynek et al; "RASTA Processing of Speech"; IEEE Transactions on Spech and Audio Processing, vol. 2, No. 4; pp. 578-589 (Oct. 1994).

Kim, Tae-Kyun; "Visual Codebook", Sidney Sussex College Lecture Notes; retrieved from the internet: http://mi.eng.cam.ac.uk/"cipolla/lectures/PartIB/old/IB-visualcodebook.pdf on Sep. 7, 2014), slides 1-8; 44 pages (May 11, 2010).

Kobayashi, Takumi et al; Acoustic Feature Extraction by Statistics Based Local Binary Pattern for Environmental Sound Classification, 2014 IEEE International Conference on Acoustic, Speech and Signal Processing, Florence, Italy; pp. 3052-3056 (May 4-9, 2014).

Li, David et al; "Auditory Scene Classification Using Machine Learning Techniques"; IEEE AASP Challenge on Detection and Classification of Acoustic Scenes and Events, Creative Commons; 3 pages (2013).

Liao, Wen-Hung et al; "Streaming Audio Classification in Smart Home Environments"; IEEE The First Asian Conference on Pattern Recognition, Beijing; pp. 593-597 (Nov. 28, 2011).

Maturana, Daniel et al; "Face Recognition with Local Binary Patterns, Spatial Pyramid Histograms and Naïve Bayes Nearest Neighbor classification": IEEE 2009 International Conference of the Chilean computer Science Society (SCCC), Santiago, TBD, Chile; pp. 125-132 (Nov. 10-12, 2009).

Nogueira, Waldo et al; "Sound Scene Identification Based on MFCC, Binaural Features and a Support Vector Machine Classifier"; IEEE AASP Challenge on Detection and classification of Acoustic Scenes and Events; Creative Commons (2013).

Ojala, Timo et al; "Multiresolution Gray-Scale and Rotation Invariant Texture Classification with Local Binary Patterns"; IEEE Transactions on Pattern Analysis and Machine Intelligence, vol. 24, No. 7; pp. 971-987 (Jul. 2002).

Peltonen, Vesa T.K. et al; Recognition of Everyday Auditory Scenes: Potentials, Latencies and Cues; Audio Engineering Society Convention Paper 5404, Presented at the 110th Convention, Amsterdam, The Netherlands 5 pages (May 12-15, 2001).

Roma, Gerard et al; "Recurrence quantification analysis features for auditory scene classification"; IEEE AASP Challenge on Detection and Classification of Acoustic Scenes and Events, Creative Commons; 2 pages (2013).

(56) References Cited

OTHER PUBLICATIONS

Zimmerman, Andreas et al; "Applications of a Context-Management System"; Lecture Notes in computer Science, vol. 3554; pp. 556-559 (2005).

* cited by examiner

ACCOUSTIC CONTEXT RECOGNITION USING LOCAL BINARY PATTERN METHOD AND APPARATUS

CROSS-REFERENCE TO RELATED APPLICATIONS

This application claims the priority under 35 U.S.C. § 119 of European patent application no. 15290128.6, filed May 12, 2015 the contents of which are incorporated by reference herein.

Aspects of the present disclosure generally relate to sound processing. In particular, the present disclosure presents solutions for audio scene recognition utilizing local binary patterns to identify patterns in audio which can be associated with, e.g., different sources, speech, music, background noise and particular events.

In many applications of computer electronics, (e.g., cell phones), customers require high levels of personalization, including the data that is presented to a user. Embodiments of the present disclosure are directed at providing such personalization by contextualizing the environment the device is being used in using audio received over a microphone. In such embodiments, the device is able to isolate and identify context(s) of the environment and present information to the user associated at least in part with the environment. The context of an audible environment may include various audio sources including sounds generally associated with a location, such as an office, bus, or street. The use of audio scene recognition over other methodologies provides several benefits including at least the ability to capture temporal events, and the ability to distinguish several co-occurring contexts in the environment. Various embodiments can take advantage of hardware present in electronic devices, such as microphones and sufficient processing circuitry. It has been discovered in accordance with the present disclosure that the ability to capture temporal events greatly increases the probability that a context will be properly identified by the device. In further more specific embodiments of the present disclosure, the device may further reduce audio processing requirements of the device, thereby increasing battery life if the device is mobile and improving overall performance of the device as less processing power needs to be allotted to background functions.

Aspects of the present disclosure apply image processing techniques on an audio spectrum by transforming the audio into an audio spectrogram (a visual representation of the audio at one or more periods of time) and analyzing a series of spectrograms from the same audio source to identify audio patterns that are indicative of an environmental context that a device receiving the audio is in (e.g., office, bus, street, etc.). The present disclosure's ability to map these audio patterns over time, using histograms associated with the series of spectrograms, greatly increases the acoustic recognition performance.

In many embodiments of the present disclosure, the acoustic recognition method may utilize a pre-defined codebook, whereby the identified audio patterns are compared to known environmental contexts. When compared, if the identified audio pattern is within a similarity threshold to one or more of the known audio patterns in the codebook, the identified audio pattern will be associated with the known audio pattern's environmental context. In such embodiments, the identified audio pattern may be added to the codebook and associated therein with the appropriate environmental context. In yet further embodiments, the method may include a learning-phase which allows a user of a device utilizing the acoustic recognition method to identify audio patterns (which the acoustic recognition method may not be able to identify) and add them to the codebook.

Various embodiments of the present disclosure are directed to identifying context(s) of an audio scene. According to one such example embodiment, a method is disclosed including the following steps. An audio signal spectrogram, indicative of an audio input, is received, and based on a comparison of adjacent pixels of the spectrogram, a plurality of local binary patterns (LBP) are constructed. For each of the plurality of blocks of the spectrogram, a respective LBP histogram that is based on a number of times different LBPs occur in a corresponding block of the plurality of blocks is created. Based upon correspondence between the LBP histograms and a plurality of code words, a codebook histogram is created. Finally, using a machine learning model, the codebook histogram is classified to identify context for the received audio signal. In yet further more specific embodiments of the present disclosure, the method may further include identifying clusters of LBP histograms, with a k-means algorithm, from the respective LBP histograms, and generating, based upon the clusters, code words which are a centroid of the identified clusters. In certain embodiments, the classification and context identification can be carried out in real-time, or in near real-time.

Other embodiments of the present disclosure are directed to an offline learning phase for identifying context(s) of an audio scene (these identified contexts can later be used in real-time applications to identify contexts of a received audio input). According to one such example embodiment, a method is disclosed including the following steps. An audio signal spectrogram, indicative of an audio input, is received, and based on a comparison of adjacent pixels of the spectrogram, a plurality of local binary patterns (LBP) are constructed. For each of the plurality of blocks of the spectrogram, a respective LBP histogram that is based on a number of times different LBPs occur in a corresponding block of the plurality of blocks is created. Based on the respective LBP histograms for each of the plurality of blocks of the spectrogram, clusters of LBP histograms are identified, and based upon the clusters, code words for a machine learning model are generated.

Many embodiments of the present disclosure are directed to apparatus. One apparatus of the present disclosure includes an audio LBP histogram module, a codebook creation module, histogram mapping module, and a support vector machine. The audio LBP histogram module receives an audio signal spectrogram indicative of an audio input. Based on a comparison of adjacent pixels of the spectrogram, the audio LBP histogram module constructs a plurality of local binary patterns (LBP). For each of a plurality of blocks of the spectrogram, the audio LBP histogram creates a respective LBP histogram that is based on a number of times different LBPs occur in a corresponding block of the plurality of blocks. The codebook creation module communicatively coupled to the audio LBP histogram module, identifies clusters of LBP histograms, with a k-means algorithm, from the respective LBP histograms. The histogram mapping module communicatively coupled to the codebook creation module and audio LBP histogram module, generates, based upon the clusters, code words which are a centroid of the identified clusters. Based upon correspondence between the LBP histograms and a plurality of code words, the histogram mapping module creates a codebook histogram. Finally, the support vector machine module, communicatively coupled to the histogram mapping module, classifies, using a machine learning model, the codebook histogram to identify context for the received audio signal.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
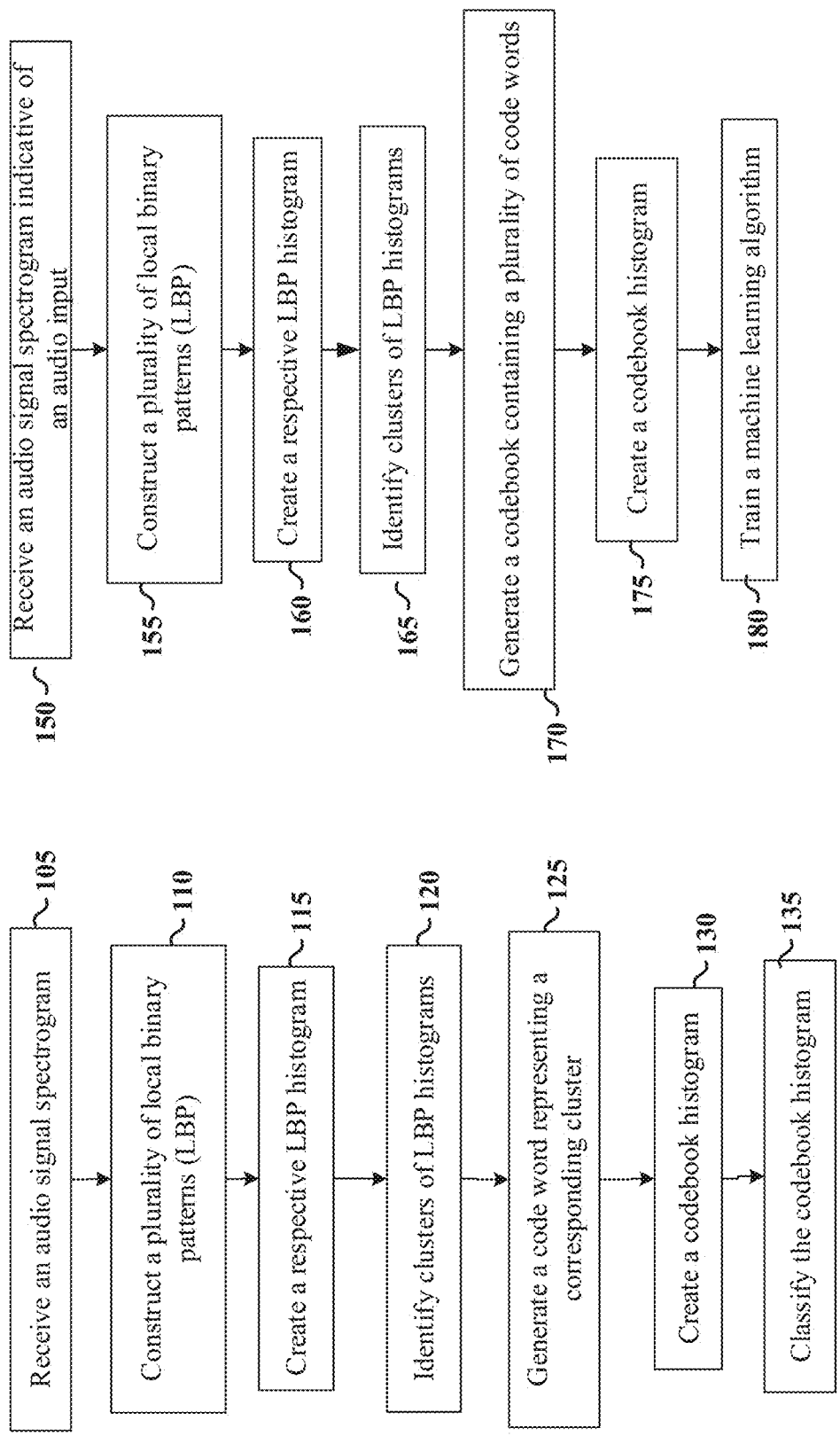
FIGS. 1A-B shows functional block diagrams, consistent with various aspects of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure generally relate to sound processing. In particular, the present disclosure presents solutions for audio scene recognition via a novel approach utilizing local binary patterns to identify patterns in audio which can be associated with context(s), e.g., different sources, speech, music, background noise and particular events.

In many applications of computer electronics (e.g., cell phones), customers require high levels of personalization in the data that is presented to the user. Embodiments of the present disclosure are generally directed to enabling such personalization by contextualizing the environment the device is being used in utilizing audio received over a built-in microphone (on-board the electronic device).

In various embodiments, the device is able to isolate and identify context(s) of the environment and adapt presented information based at least in part on the environment. For example, the device can be configured to determine, based upon classification of sounds in a received audio signal (and other factors such as time of day, location and other device discernable information), that the user was on the street on his way home from work, for example. The device could then display information indicative of current traffic patterns, best routes home, weather conditions, and local restaurants in the area currently offering happy hour specials.

The context identified by the device may include various distinguishable aspects of the audible environment, such as the hum of fluorescent lights in an office, the exhaust noise of a city bus, or the various ambient noises of a city street (such as car horns), etc. The use of audio scene recognition over other methodologies provides several benefits including at least the ability to capture temporal events, and the ability to distinguish several co-occurring contexts in the environment. It has been discovered that the ability to correlate a single audio event over a period of time greatly increases the ability to positively identify the audio event (or context). Also, aspects of various embodiments can be particularly useful for limiting additional hardware, as many electronic devices already include microphones and sufficient processing circuitry.

Aspects of the present disclosure are also directed to reducing processing requirements for the received audio. In many cases, such embodiments are ideally embedded into mobile devices which have a finite amount of electrical power. In further more specific embodiments of the present disclosure, the audio processing methods may further reduce audio processing requirements of the device, thereby increasing battery life if the device is mobile, and improving overall performance of the device as less processing power needs to be allotted to background functions (including audio processing). The present embodiment achieves such a reduction in power usage by minimizing the comparisons required between a histogram associated with a received audio signal and codebook histograms by, for example, clustering the various codebook histograms that are located relative to one another into a single centroid (this also reduces memory usage of the audio processing methodology).

Aspects of the present disclosure apply image processing techniques on an audio spectrum by transforming the audio into an audio spectrogram (a visual representation of the audio at one or more periods of time) and analyzing a series of spectrograms from the same audio source to classify and identify audio patterns that are indicative of an environmental context that a device receiving the audio is in (e.g., office, bus, street, etc.). The ability to map these audio patterns over time can greatly increase the acoustic recognition performance. In embodiments of the present disclosure, the acoustic recognition method may utilize a pre-defined codebook that can be used to classify and identify audio patterns relative to known environmental contexts. When compared, if the identified audio pattern is within a similarity threshold to one or more of the known audio patterns in the codebook, the identified audio pattern will be associated with the known audio pattern's environmental context. In yet further embodiments, the method may include a learning-phase which allows a user utilizing the acoustic recognition method to identify audio patterns (which the acoustic recognition method may not otherwise be able to currently identify given its existing codebook) and add such contexts to the codebook.

Various example embodiments of the present disclosure are directed to methods, circuits, and systems that address challenges directed to acoustic context recognition and its implementation. It should also be understood that aspects of the present disclosure may also be utilized in other areas of audio recognition including speech recognition.

Embodiments of the present disclosure are directed to a learning phase for identifying context(s) of an audio scene. The identified context can later be used in (real-time) applications to identify contexts of a received audio input. According to example embodiments, a processing device (e.g., one or more computer processor units or circuits) receives an audio signal in the form of a spectrogram that is indicative of an audio input. The processing device can then compare adjacent pixels of the spectrogram to construct a plurality of local binary patterns (LBP). For each of a plurality of sub-blocks of the spectrogram (e.g., sub-blocks that correspond to different audio frequency ranges), a respective LBP histogram is created based on a number of times different LBPs occur. The processing device can then use the respective LBP histograms for each of the plurality of blocks of the spectrogram to identify clusters of LBP histograms. Code words are then created from the clusters (e.g., code words that are based upon an average or centroid of each of the clusters). The processing device code words can then be classified according to a machine learning algorithm or model.

Various embodiments of the present disclosure are directed to a method for identifying context(s) of an audio scene. According to example embodiments, a codebook that was created based upon clustering of LBP histograms can be used as a feature list. Particular details regarding the creation of such a codebook are described in more detail herein. The use of such a codebook can be particularly useful in that it provides a compact and discriminant set of features from which to classify the audio content. Consistent with embodiments, a processing device can receive an audio signal spectrogram, indicative of an audio input. The processing device can then construct a plurality of LBPs based on a comparison of adjacent pixels of the spectrogram.

For each of a plurality of sub-blocks of the spectrogram, a respective LBP histogram that is based on a number of times different LBPs occur in a corresponding block of the plurality of blocks, is created. The plurality of LBPs are indicative of pixel values, threshold transitions, and respective pixel locations in each of the plurality of blocks of the spectrogram. The respective LBP histogram, for each of the plurality of blocks of the spectrogram, is indicative of an acoustic context of the audio input over a period of time. In more specific embodiments, each respective LBP histogram maps each of the plurality of blocks of the spectrogram into a plurality of uniform configurations and a non-uniform configuration. Based upon correspondence between the LBP histograms and a plurality of code words, a codebook histogram is created. In further embodiments, the creation of the codebook histogram further includes determining a cosine distance between the LBP histograms and the code words using a cosine distance between the LBP histograms and the code words, and assigning the LBP histograms to code words in the codebook histogram based upon the cosine distance.

Finally, using a machine learning model that was trained using the codebook, the codebook histogram is classified to identify context for the received audio signal. In various embodiments, the machine learning model is within a support vector machine. In yet further more specific embodiments of the present disclosure, the clusters of LBP histograms can be identified using a k-means clustering algorithm. The k-means clustering algorithm is a machine learning technique that partitions n observations into k clusters in which each observation belongs to the cluster with the nearest mean. Given a set of observations ($x_1$, $x_2$, ..., $x_n$), where each observation is a d-dimensional real vector, k-means clustering aims to partition the n observations into k ($\leq n$) sets S={$S_1$, $S_2$, ..., $S_k$} so as to minimize the within-cluster sum of squares (WCSS). The k-means clustering equation is:

$$\underset{s}{\operatorname{argmin}} \sum_{i=1}^{k} \sum_{x \in S_i} \|x - \mu_i\|^2$$

where $\mu_i$ is the mean of points in $S_i$. The algorithm ultimately finds clusters of a comparable spatial extent. The processing device can then generate code words that are based upon centroids for the clusters.

Many embodiments of the present disclosure further include interpolating, for each of the LBP histograms, using pixel values outside a respective block for each of the LBP histograms.

Many embodiments of the present disclosure are directed to apparatus. One apparatus of the present disclosure includes an audio LBP histogram module, a codebook creation module, histogram mapping module, and a support vector machine. The audio LBP histogram module receives an audio signal spectrogram indicative of an audio input. Based on a comparison of adjacent pixels of the spectrogram, the audio LBP histogram module constructs a plurality of local binary patterns (LBP). For each of a plurality of blocks of the spectrogram, the audio LBP histogram creates a respective LBP histogram that is based on a number of times different LBPs occur in a corresponding block of the plurality of blocks. The codebook creation module communicatively coupled to the audio LBP histogram module, identifies clusters of LBP histogams, with a k-means algorithm, from the respective LBP histograms. The histogram mapping module communicatively coupled to the codebook creation module and audio LBP histogram module, generates, based upon the clusters, code words which are a centroid of the identified clusters. Based upon correspondence between the LBP histograms and a plurality of code words, the histogram mapping module creates a codebook histogram. Finally, the support vector machine module, communicatively coupled to the histogram mapping module, classifies, using a machine learning model, the codebook histogram to identify context for the received audio signal.

Turning now to the figures, various embodiments of the present disclosure are presented by way of the illustrations.

FIG. 1A shows a functional diagram for recognizing an acoustic context of an audio signal, consistent with various aspects of the present disclosure. First, an audio signal spectrogram indicative of an audio input is received 105. A plurality of local binary patterns (LBP) are then constructed 110 based on a comparison of adjacent pixels of the received spectrogram. For each of a plurality of blocks of the spectrogram, a respective LBP histogram is created 115 based on a number of times different LBPs occur in a corresponding block of the plurality of blocks. From each of the respective LBP histograms, clusters of LBP histograms are identified 120. For each of the clusters, a code word representing a corresponding cluster is generated 125. The LBP histograms and the code words representing the clusters are then compared to create a codebook histogram 130. Finally, using a machine learning model, the codebook histogram is classified 135 to identify context for the received audio signal.

FIG. 1B shows another functional diagram for recognizing an acoustic context of an audio signal, consistent with various aspects of the present disclosure. First, an audio signal spectrogram indicative of an audio input is received 150. A plurality of local binary patterns (LBP) are then constructed 155 based on a comparison of adjacent pixels of the received spectrogram. For each of a plurality of blocks of the spectrogram, a respective LBP histogram is created 160 based on a number of times different LBPs occur in a corresponding block of the plurality of blocks. From each of the respective LBP histograms, clusters of LBP histograms are identified 165. Based upon the clusters of the LBP histograms, a codebook is generated containing a plurality of code words 170, then the LBP histograms are mapped to the code words of the codebook to create a codebook histogram 175. Finally, a machine learning algorithm is trained 180 using the LBP histograms as features therefore.

Figure 2:
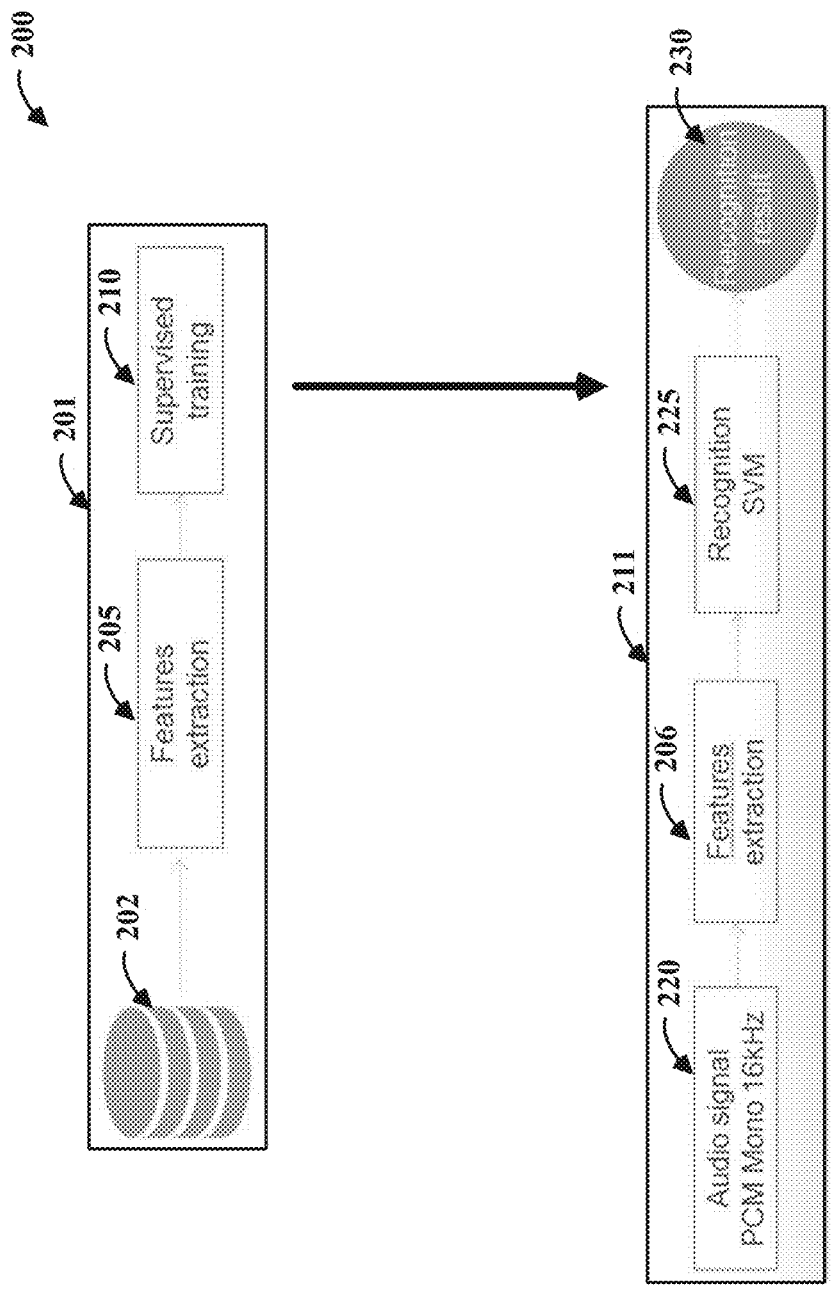
FIG. 2 shows a system level block diagram, consistent with various aspects of the present disclosure.

FIG. 2 shows a system level block diagram, consistent with various aspects of the present disclosure. The system 200 includes a learning device 201 that creates a (support vector machine, "SVM") model that classifies known contexts by using a codebook of histograms as the features used in the classification. A device 211 receives the (SVM) model from the learning device 201, and uses the model to classify received sounds for which the context is not known (the real-time usage). In various embodiments of the present disclosure, the model may be transferred to the device 211 utilizing wired or wireless communication means. Furthermore, in some embodiments, the model may be regularly updated to include newly classified audio context.

In reference to the learning device 201, a memory module 202 containing audio data with known contexts, provides the audio data to a features extraction module 205. The features extraction module 205 constructs audio signal spectrograms in a temporal manner over the time-length of the audio data. The spectrograms are then divided into sub-blocks and each sub-block is multiplied by an audio adapted local binary pattern ("LBP"). Histograms of LBPs are extracted for each sub-block, each histogram comprising the audio spectrum of the environment. The features extraction module 205 then utilizes a clustering algorithm to create a codebook of acoustic patterns. These acoustic patterns represent common characteristics (or features) that can be used to identify the context (or noise) that may be relevant for a given application.

Consistent with embodiments of the present disclosure, the clustering of the LBPs reduces, or compresses, the features for analysis. This can be particularly useful for reducing the use of device processing and memory resources. In particular embodiments, with all the histograms extracted, a k-means clustering algorithm (based on cosine similarity) may be utilized to group similar histogram blocks and to obtain a final codebook with the relevant patterns of the dataset. Centroids of the clusters are written as the elements of the codebook. Supervised training module 210 creates a (SVM) model that classifies the known contexts by using the codebook of histograms as the features used in the classification. The output is an (SVM) model that can be used to classify future sounds for which the context is not known (the real-time usage).

In reference to the device 211 of the system 200, the model of the learning device 201 is configured in the features extraction module 206 of the device 211. The model including a codebook that represents the common characteristic, or features, of the types of context that are desirable to detect in a given application(s). An audio signal is received by an audio signal receiving module 220 (e.g., microphone, or other audio reception mechanism). The audio signals, in many embodiments, are indicative (at least in part) of an environment in which the audio signal receiving module 220 is located within. For example, if a device such as a cellphone including the various modules of FIG. 2 is at a sporting event, the acoustic context (including, e.g., speech, music, background noise and other particular acoustic events) can be processed according to aspects of the present disclosure to indicate the contextual environment of the cellphone, the sporting event. This can include classifying various audio features according to learned characteristics that are consistent with a sporting event. In such embodiments (and potentially in conjunction with other collected data such as location data, user inputs, etc.), the cellphone can be configured to customize the user interface to display relevant information to the sporting event such as up-to-date player statistics, news, instant replays, and other league related news.

The audio signal receiving module 220 may conduct a number of ancillary functions to the received audio signal such as noise reduction, amplification, etc. before transmitting the audio signal to the features extraction module 206. The features extraction module 206 first constructs an audio signal spectrogram indicative of the audio output received by the audio signal receiving module 220. The features extraction module 206 then develops a plurality of local binary patterns (LBP) based on a comparison of adjacent pixels of the spectrogram. Based on each of a plurality of blocks of the spectrogram, a respective LBP histogram is created that is based on the number of times different LBPs occur in a corresponding block of the plurality of blocks. Based upon correspondence between the LBP histograms and a plurality of code words, a codebook histogram is created. Finally, the recognition SVM 225 classifies, using a machine learning model, the codebook histogram to identify context for the received audio signal. The recognition result 230, provided as an output of recognition SVM 225, can indicate the context(s) for the received audio. It is to be understood that other classifiers used in supervised learning may also be utilized in the present disclosure, besides a support vector machine, e.g., artificial neural networks, and Gaussian mixture models.

Figure 3:
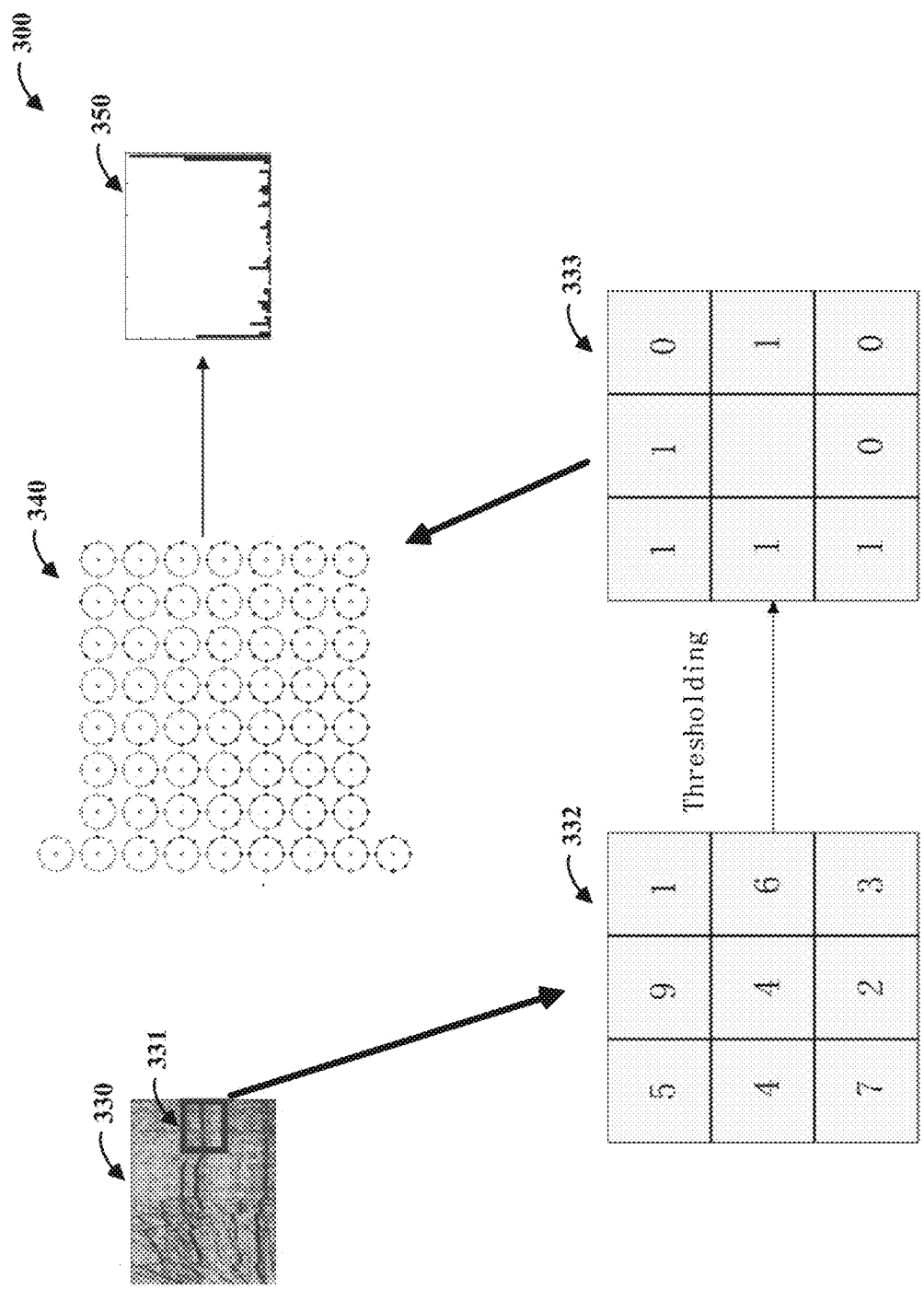
FIG. 3 is a diagram showing the creation of LBPs from an audio signal, consistent with various aspects of the present disclosure.

FIG. 3 shows a diagram showing the creation of LBPs from an audio signal, consistent with various aspects of the present disclosure. In various embodiments, a processing device 300 can include a features extraction module that can be used to generate LBPs from a spectrogram 330 of an audio signal. A possible format for the spectrogram 330 is a graph where one axis (e.g., the horizontal axis) represents time and another axis (e.g., the vertical axis) represents frequency. The amplitude or volume can be indicated by the intensity or color of the image pixels.

The features extraction module can break the spectrogram 330 into a number of sub-blocks, including block 331. The spectrogram 330, in certain embodiments, can be a linear-spectrum spectrogram. Due to the local nature of the sub-blocks, each sub-block can represent a particular time and frequency range of the audio signal. It has been discovered that linear representations of a spectrogram contain less noise and can be primarily dominated by sparse high-energy elements (increasing the likelihood of pattern recognition). As shown in 332, for each pixel of the image, a block is built around the central pixel. As shown in 333, the value of each pixel can be compared with the surrounding pixels (using thresholding) if the values are lower, they are mapped as zeroes; if greater, as ones. In specific embodiments, the value of the surrounding pixels can be compared with a mean over the entire block 331, although other variations for determining a comparison threshold are possible. In such embodiments, this mean approach can make the algorithm more robust to noise and to large variations between pixels.

Starting from the top-left corner of block 332, the binary values are transformed (see, e.g., Binary: 11010011). In certain embodiments the binary result of the block 332 can be modeled as indicative of one of the 59 possible bit combination circles depicted in 340 by interpolating the values. In particular, the first 58 bit combinations represent uniform bit combinations in which the number of binary transitions between ones and zeroes is no greater than 2. A non-uniform LBP can be mapped to a $59^{th}$ bit combination. Accordingly, the dimensions of the resulting histogram 350 can be limited to one of the 59 possible patterns in the algorithm (each pattern taking into account the possible orientations of the resulting block 333). Consistent with various embodiments, other histograms are also possible including more exhaustive lists of bit combinations or further reduced bit combinations. For example, one or more non-uniform bit combinations may be particularly discriminatory in certain applications. The histogram dimensions could therefore be expanded to include such bit combinations. Alternatively, or in addition, one or more uniform bit combinations may be removed for certain applications.

Each time a pattern is found in the block (one of the 59 possible patterns), that pattern is accumulated in the resulting histogram 350. The resulting histogram 350 takes into account the occurrences of each i-th pattern and directly represents the pattern distributions of the image.

Figure 4:
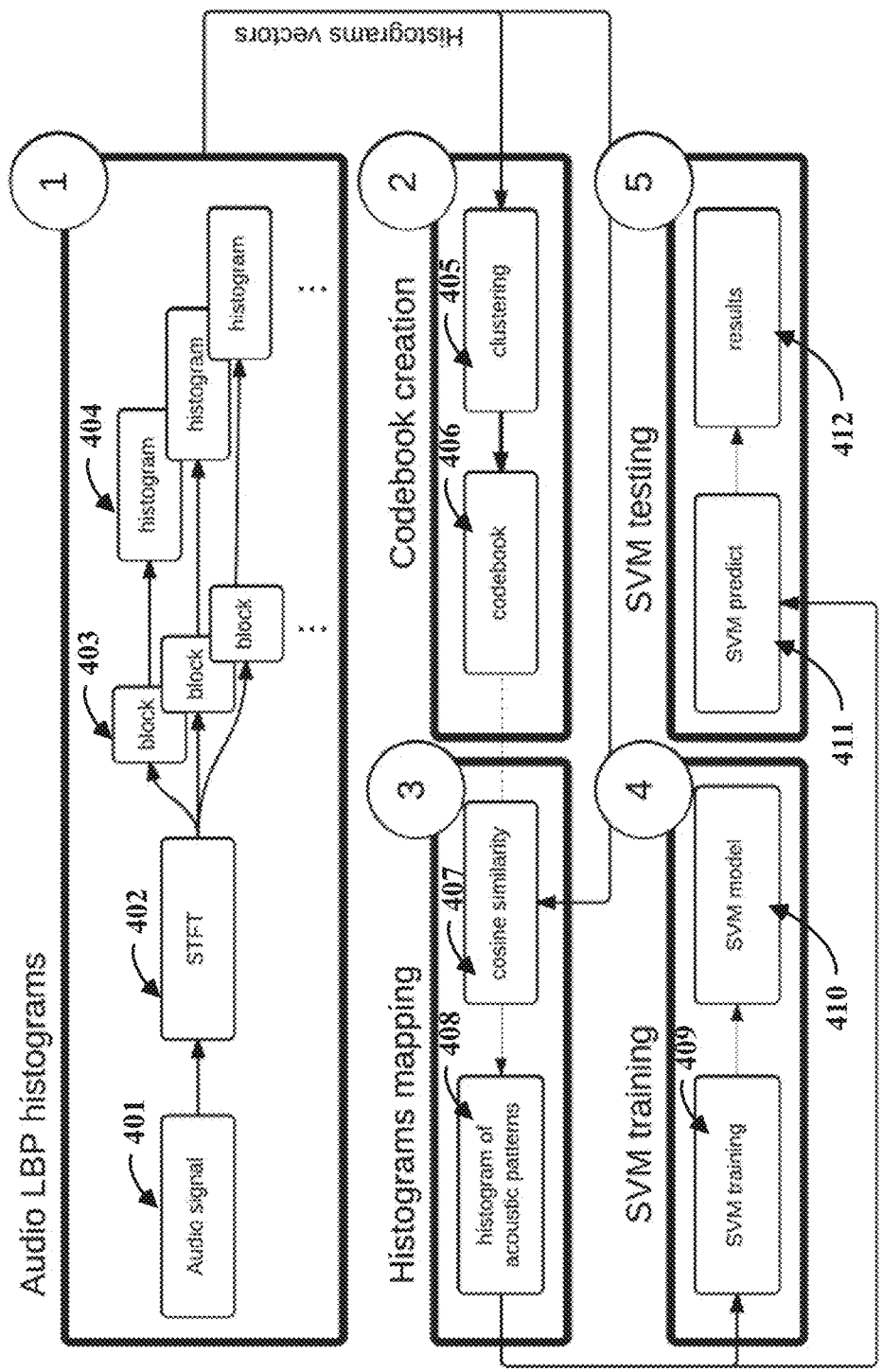
FIG. 4 shows a functional block diagram, consistent with various aspects of the present disclosure.

FIG. 4 shows a functional block diagram for recognizing an acoustic context of an audio signal, consistent with various aspects of the present disclosure. The solution of FIG. 4 exploits an LBP, an image processing technique that utilizes an audio signal spectrogram representation, a histogram, to recognize an acoustic context. The LBP can be used as an efficient texture operator which labels the pixels of a spectrogram image by thresholding the neighboring pixels and computing the result as a binary number (as discussed in more detail herein).

The LBP is particularly well-suited to various audio applications as its algorithm is robust even against huge fluctuations between neighboring pixels in a spectrogram (which are common in audio spectrograms). The LBP also benefits from the ability to build more discriminative features, which utilize the time-frequency information of the spectrum. It has been discovered that capturing and correlating context events over a period of time can significantly increase the recognition performance of the context event.

Exemplary circuitry to recognize acoustic contexts using an LBP-based algorithm are described in detail in reference to FIG. 4. In accordance with embodiments of the present disclosure, the circuitry is partitioned into five blocks/modules: audio LBP histograms module 1, codebook creation module 2, histograms mapping module 3, SVM training module 4, and SVM testing module 5.

The audio LBP histograms module 1 receives an audio signal 401 and converts the audio signal into a spectrogram 402. The spectrogram is then divided into blocks 403 (e.g., blocks that correspond to different audio frequency ranges) and utilizing an LBP algorithm finds recurrent patterns from the input image (spectrogram) by comparing the value of each pixel with its respective neighbors. A LBP histogram 404 is then built for each of the blocks 403 of the spectrogram 402, counting how many times a pattern is found in the entire image. The input image can be a spectrogram 402 of an audio signal 401 and it has to be modified to better fit with the LBP algorithm.

During supervised training of the system using known audio sequences, the codebook creation module can be used to identify features that can then be used to train a machine learning module, such as an SVM. Once the LBP histograms from the entire dataset have been extracted, the codebook creation module 2 can employ a clustering technique 405 to group together frequently used histograms. The cluster values can then be used to form a codebook 406. The histograms mapping module 3 then exploits the cosine similarity 407 to find which codebook histograms 408 in the codebook 406 are similar. The LBP histograms 404 can then be mapped onto one of the code words from the codebook. After these steps, the features of the codebook histograms 408 are less redundant and with lower dimensions than the LBP histograms 404 alone. This can be particularly useful for embedded devices, which may have memory and computational constraints.

The codebook histograms 408 from the histograms mapping module 3 become the input features of the SVM training module 4 and SVM testing module 5. In various embodiments of the present disclosure, the SVM training module 4 will be trained 409 to classify either on the 59-dimensions histograms for the three sub-bands or on the features mapped into one of the possible pattern(s) in the dictionary. As a result, an SVM model 410 is created, which can be used by the SVM testing module 5 to predict 411 and output 412 a context indicative of a received audio signal. In many embodiments the SVM modules 4 and 5 project the data into a higher dimensional space, in this new space it is possible to apply a linear separation using the hyperplane with the maximal margin and the minimum error of classification. In addition, a denser representation is able to maximize the distance between the different contexts and improve the discriminative power of SVM.

In certain experimental embodiments of the present disclosure, an LBP algorithm is disclosed that compares the surrounding pixels with the mean over the entire block:

$$LBP_{P,R} = \sum_{i=0}^{P-1} f(g_i - \mu)2^P,$$

$$f(x) = \begin{cases} 1, & x \geq \mu \\ 0, & x < \mu \end{cases}$$

where $g_i$ is the i-th neighbour's value, $\mu$ is the mean over the block, P is the number of involved pixels. R is the radius of the neighborhood: the coordinates of $g_i$ are R $\cos(2\pi i/P)$, $\sin(2\pi i/P)$. The pixel values that are not in the block can be estimated by hi-linear interpolation. A pixel can be then interpolated using both x and y coordinates in the 3*3 block combined with interpolation weights $w_i$:

$$z = w_0 + w_1 x + w_2 y + a_3 xy$$

In various example embodiments, the pixel values in the spectrogram are affected by huge fluctuations which can detriment LBP representation (resulting in a possibly limitless number of potential dimensions of a histogram). To reduce the potential dimensions of a histogram, consider the transition between 0's and 1's in the LBP code: if the number of transitions is less or equal to 2, the LBP binary string is considered uniform and it will be mapped into one of 58 configurations, like in FIG. 2 (the 59th is therefore for the non-uniform ones). Uniform patterns ensure the presence of a relevant texture element, such as an edge, corner or uniform zone and it will discard the non-uniform ones (to the 59th configuration), which are more likely to have been affected by noise. In experimental testing, this histogram reduction has been demonstrated to perform well.

Referring to spectrogram analysis in various embodiments of the present disclosure, pixels in the spectrogram express energy information in specific time-frequency coordinates. Many embodiments of the present disclosure utilize linear spectrum spectrographs to log-spectrum spectrographs, which are less dominated by noise. The linear spectrograms are primarily formed by sparse high-energy elements, while the remaining elements do not disturb pattern recognition. In such embodiments, frequency-bands are separated in three different bands, less than 900 Hz, from 900 to 2 kHz and from 2 kHz until 8 kHz, to represent the entire information contained in the signal, sampled at 16 kHz. The particular frequency ranges can be adjusted based upon the particular sampling rate and other considerations, such as the types of context being analyzed. The LBP algorithm uses these three sub-bands to perform the acoustic pattern recognition, and to extract a histogram for each of the corresponding blocks of the spectrogram (like in FIG. 2).

In specific embodiments of the present disclosure, the algorithm used for creating the codes in the codebook includes a further step before the classification to make the features more compact. This further step discovers the most representative patterns in the dataset and extracts them automatically, using an unsupervised classification. The creation of a codebook of the most representative histograms is an essential part of the algorithm, as it allows for the classification of unknown acoustic contexts. A k-means clustering algorithm (or other clustering algorithm) may be used to group the similar blocks and obtain a final codebook with the most relevant patterns of the dataset. Cosine distance may be used as a good metric for many feature descriptors, especially histogram features. Finally, the centroids of the clusters become the elements of the codebook, as described in more detail above.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., first module, second module, and memory module). For example, in certain of the above-discussed embodiments, one or more modules are discrete logic circuits or programmable logic circuits configured and arranged for implementing these operations/activities, as shown in FIG. 1. In certain embodiments, such a programmable circuit is one or more computer circuits programmed to execute a set (or sets) of instructions (and/or configuration data). The instructions (and/or configuration data can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, acoustic context recognition, as disclosed herein, could be utilized in a speech recognition environment, and/or other computer-based audio recognition applications that would benefit from the various advantages of the present disclosure. Such modifications do not depart from the true spirit and scope of various aspects of the invention, including aspects set forth in the claims.

The invention claimed is:

1. A method comprising:
   receiving an audio signal at a microphone that is built in to an electronic device;
   constructing an audio signal spectrogram, having adjacent pixels, indicative of the audio received at the microphone;
   dividing the audio signal spectrogram into a plurality of blocks;
   constructing a plurality of local binary patterns (LBP) based on a comparison of the adjacent pixels of the spectrogram;
   creating, for each of the plurality of blocks of the spectrogram, a respective LBP histogram that is based on a number of times different LBPs occur in a corresponding block of the plurality of blocks;
   identifying clusters of LBP histograms from the respective LBP histograms;
   generating, for each of the clusters, a code word representing a corresponding cluster;
   creating a codebook histogram based upon correspondence between the LBP histograms and the code words representing the clusters; and
   classifying, using a machine learning model, the codebook histogram to identify environmental context that indicates a location of the electronic device at the time the audio signal was received at the microphone;
   wherein the respective LBP histogram, for each of the plurality of blocks of the spectrogram, is indicative of an acoustic context of the audio input over a period of time;
   wherein the audio signal spectrogram is a linear spectrum representation of the audio input over a frequency range and wherein each of the plurality of blocks for which an LBP histogram is created represents a particular sub-time over the period of time and a particular sub-frequency range that is within the frequency range of the audio signal.

2. The method of claim 1, wherein the plurality of LBPs are indicative of pixel values, threshold transitions, and respective pixel locations in each of the plurality of blocks of the spectrogram.

3. The method of claim 1, wherein creation of the codebook histogram further includes:
   determining a cosine distance between the LBP histograms and the code words using the cosine distance between the LBP histograms and the code words, and assigning the LBP histograms to code words in the codebook histogram based upon the cosine distance.

4. The method of claim 1, further comprising the step of interpolating, for each of the LBP histograms, by using pixel values outside a respective block for each of the LBP histograms.

5. The method of claim 1, wherein each respective LBP histogram is a histogram of a relationship between each of the plurality of blocks of the spectrogram as defined by a plurality of uniform configurations and a non-uniform configuration.

6. The method of claim 1, wherein the plurality of blocks of the spectrogram are defined by blocks within 0 Hz-900 Hz frequency-band, blocks within 900 Hz-2000 Hz frequency-band, and blocks within 2000 Hz-8000 Hz frequency-band.

7. The method of claim 1, wherein the LBP is defined by an algorithm:

$$LBP_{P,R} = \sum_{i=0}^{P-1} f(g_i - \mu)2^P,$$

$$f(x) = \begin{cases} 1, & x \geq \mu \\ 0, & x < \mu \end{cases},$$

wherein $g_i$ is a neighboring pixel's value, $\mu$ is a mean over a particular block, P is a number of pixels in the particular block, R is a radius of a neighborhood and wherein coordinates of $g_i$ are R cos($2\pi i/P$), sin($2\pi i/P$).

8. The method of claim 1, wherein the electronic device is a cellphone.

9. The method of claim 1, wherein the electronic device is a mobile device.

10. A method comprising the steps of:
receiving an audio signal spectrogram indicative of an audio input;
dividing the audio signal spectrogram into a plurality of blocks;
constructing a plurality of local binary patterns (LBP) based on a comparison of adjacent pixels of the spectrogram;
creating, for each of the plurality of blocks of the spectrogram, a respective LBP histogram that is based on a number of times different LBPs occur in a corresponding block of the plurality of blocks;
identifying clusters of LBP histograms from the respective LBP histograms for each of the plurality of blocks of the spectrogram;
generating, based upon the clusters, a codebook containing a plurality of code words;
mapping the LBP histograms to the code words of the codebook to create a codebook histogram; and
training a machine learning algorithm using the LBP histograms as features therefore to identify environmental context that indicates a location of an electronic device at the time an audio signal is received at a microphone of the electronic device;
wherein the respective LBP histogram, for each of the plurality of blocks of the spectrogram, is indicative of an acoustic context of the audio input over a period of time;
wherein the audio signal spectrogram is a linear spectrum representation of the audio input over a frequency range and wherein each of the plurality of blocks for which an LBP histogram is created represents a particular sub-time over the period of time and a particular sub-frequency range that is within the frequency range of the audio signal.

11. The method of claim 10, further comprising interpolating, for each of the LBP histograms, using pixel values outside a respective block for each of the LBP histograms.

12. The method of claim 10, wherein each respective LBP histogram maps each of the plurality of blocks of the spectrogram into a plurality of uniform configurations and a non-uniform configuration.

13. The method of claim 10, wherein the plurality of blocks of the spectrogram are defined by blocks within 0 Hz-900 Hz frequency-band, blocks within 900 Hz-2000 Hz frequency-band, and blocks within 2000 Hz-8000 Hz frequency-band.

14. The method of claim 10, wherein the machine learning algorithm is within a support vector machine.

15. The method of claim 10, wherein the LBP is defined by an algorithm:

$$LBP_{P,R} = \sum_{i=0}^{P-1} f(g_i - \mu)2^P,$$

$$f(x) = \begin{cases} 1, & x \geq \mu \\ 0, & x < \mu \end{cases},$$

where gi is a neighboring pixel's value, µ is a mean over a particular block, P is a number of pixels in the particular block, R is a radius of a neighborhood and wherein the coordinates of gi are R cos(2πi/P), sin(2πi/P).

16. The method of claim 10, wherein the electronic device is a cellphone.

17. The method of claim 10, wherein the electronic device is a mobile device.

* * * * *